US012140104B2

(12) United States Patent
De Benedictis et al.

(10) Patent No.: US 12,140,104 B2
(45) Date of Patent: Nov. 12, 2024

(54) METHOD FOR OPERATING A FUEL INJECTION SYSTEM FOR SUPPLYING A COMBUSTION ENGINE WITH FUEL, AND ELECTRONIC CONTROL UNIT

(71) Applicant: Robert Bosch GmbH, Stuttgart (DE)

(72) Inventors: Antonio De Benedictis, Ugento (IT); Antonio Diaferia, Corato (IT); Bernd Frey, Rutesheim (DE); Bjoern Noack, Rutesheim (DE); Charlotte Summerer, Stuttgart (DE); Christos Hondros, Ludwigsburg (DE); Ciro Medolla, Molfetta (IT); Daniel Zander, Oberriexingen (DE); John Kuesters, Vreden (DE); Michael Hackner, Winterbach (DE); Nello Medoro, Trinitapoli (IT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/548,836

(22) PCT Filed: Feb. 8, 2022

(86) PCT No.: PCT/EP2022/052992
§ 371 (c)(1),
(2) Date: Sep. 1, 2023

(87) PCT Pub. No.: WO2022/184386
PCT Pub. Date: Sep. 9, 2022

(65) Prior Publication Data

US 2024/0151191 A1 May 9, 2024

(30) Foreign Application Priority Data

Mar. 4, 2021 (DE) ........................ 10 2021 202 096

(51) Int. Cl.
*F02D 41/38* (2006.01)

(52) U.S. Cl.
CPC .... *F02D 41/3845* (2013.01); *F02D 2041/389* (2013.01); *F02D 2200/0602* (2013.01)

(58) Field of Classification Search
CPC ........... F02D 41/3845; F02D 2041/389; F02D 2200/0602

(Continued)

(56) References Cited

U.S. PATENT DOCUMENTS

| | | | | |
|---|---|---|---|---|
| 7,243,636 | B2 * | 7/2007 | Joos .................... | F02D 41/3836 123/456 |
| 2010/0268439 | A1 | 10/2010 | Cinpinski et al. | |
| 2021/0277845 | A1 * | 9/2021 | Taxon ....................... | F23K 5/04 |

FOREIGN PATENT DOCUMENTS

| | | |
|---|---|---|
| DE | 102009045369 A1 | 4/2011 |
| DE | 102015212428 A1 | 1/2017 |

(Continued)

OTHER PUBLICATIONS

Translation of International Search Report for Application No. PCT/EP2022/052992 dated May 23, 2022 (2 pages).

*Primary Examiner* — Lindsay M Low
*Assistant Examiner* — Omar Morales
(74) *Attorney, Agent, or Firm* — Michael Best & Friedrich LLP

(57) ABSTRACT

The invention relates to a method for operating a fuel injection system (1) for supplying a combustion engine of a vehicle with fuel, in which method the fuel is conveyed at high pressure with the aid of a high-pressure pump (2), fed to a high-pressure accumulator (3), and injected into a cylinder of the combustion engine with the aid of at least one injector connected to the high-pressure accumulator (3). In order to detect any damage to the drive of the high-pressure pump (3), according to the invention a) the pressure (P) in the high-pressure accumulator (3) is measured and, on the basis of the measured values, a (Continued)

pressure drop (ΔP) in the high-pressure accumulator (3) caused by an injection into a cylinder is determined, b) a maximum pressure gradient is determined during a pressure build-up phase following the injection, c) the determined pressure drop (ΔP) and the determined maximum pressure gradient are put into proportion.

The invention further relates to an electronic control unit for carrying out the method.

9 Claims, 5 Drawing Sheets

(58) Field of Classification Search
USPC .......................................................... 123/447
See application file for complete search history.

(56) References Cited

FOREIGN PATENT DOCUMENTS

| | | | |
|---|---|---|---|
| DE | 102017212762 | A1 | 1/2019 |
| WO | 2012156185 | A2 | 11/2012 |

* cited by examiner a)

b)

METHOD FOR OPERATING A FUEL INJECTION SYSTEM FOR SUPPLYING A COMBUSTION ENGINE WITH FUEL, AND ELECTRONIC CONTROL UNIT

BACKGROUND

The invention relates to a method for operating a fuel injection system, in particular a common rail injection system, for supplying a combustion engine of a vehicle with fuel. Moreover, the invention relates to an electronic control unit.

A fuel injection system, in particular a common rail injection system, for supplying a combustion engine of a vehicle with fuel comprises a high-pressure pump by means of which fuel can be conveyed at high pressure and fed to a high-pressure accumulator of the system, the so-called "rail". At least one injector is connected to the high-pressure accumulator in order to remove fuel from the high-pressure accumulator and inject it into a cylinder of the combustion engine. The removal of fuel from the high-pressure accumulator is noticeable by a pressure drop which can be re-equilibrated by the conveyance operation of the high-pressure pump. Further factors that affect the pressure in the high-pressure accumulator are properties of the fuel, in particular its quality and temperature, because they affect the compressibility of the fuel. A pressure sensor is therefore typically integrated into the high-pressure accumulator in order to monitor the pressure.

A high-pressure pump arranged in a fuel injection system, in particular in a common rail injection system, can comprise one or more pump elements. Each pump element typically has a liftable pump piston supported via a roller plunger on a camshaft of the pump. When the camshaft rotates, the roller of the roller plunger runs off circumferentially on the cam. On the other end, the roller plunger is received in a cylinder bore of the pump housing such that the rotation of the camshaft is converted into a stroke movement of the pump piston. Damage to the drive can occur due to a misalignment of the roller of the roller plunger relative to the cam of the camshaft due to increased wear and/or a sticking of the roller. This can result in the fuel supply of the combustion engine becoming unavailable and the vehicle breaking down. If the vehicle is used for business purposes, a high level of economic damage can be associated with the failure of the vehicle. There is therefore an interest in an early detection of any damage to the drive in order to prevent a breakdown of the vehicle by visiting a service station in a timely manner.

In particular, the proposed method can comprise method steps which, in a different context, have already been described in DE 10 2017 212 762 A1, which is an earlier application of the same applicant. Reference is therefore made to this earlier application, in particular with regard to the method steps of detecting a pressure (P) in the high-pressure accumulator in an angle-synchronous manner, as well as determining a frequency-transformed spectrum (DFT(P)) of the sensed pressure (P), which are in particular described in further detail in paragraphs [0007] and [0009] of the earlier application.

SUMMARY

In the proposed method for operating a fuel injection system for supplying a combustion engine of a vehicle with fuel, the fuel is conveyed at high pressure with the aid of a high-pressure pump, fed to a high-pressure accumulator, and injected into a cylinder of the combustion engine with the aid of at least one injector connected to the high-pressure accumulator. According to the invention, the method comprises steps a) to c) for detecting any damage to the drive of the high-pressure pump. In step a), the pressure (P) in the high-pressure accumulator is measured and, on the basis of the measured values, a pressure drop ($\Delta P$) in the high-pressure accumulator caused by an injection into a cylinder is determined. In step b) a maximum pressure gradient is determined during a pressure build-up phase following the injection. In step c), the pressure drop ($\Delta P$) determined in step a) and the maximum pressure gradient determined in step b) are put into proportion.

Insofar as damage to the drive of the high-pressure pump is present, this has an impact on the pressure build-up in the high-pressure accumulator. In the event of damage, the wear in the contact region between the roller plunger and the cam increases, so that the pump piston of the corresponding pump element can no longer carry out a full stroke. With the aid of the proposed method, this effect can be visualized, because the graph runs flatter when one puts the parameters determined in step a) and b) of the method into proportion.

The effects of damage to the drive on the pressure in the high-pressure accumulator are primarily or exclusively seen in the pressure build-up phase. The situation is different for a change of the influencing factors mentioned above, for example fuel quality and/or fuel temperature. These affect the pressure in the high-pressure accumulator both during the pressure drop and during the pressure build-up. The curve representing the pressure profile is therefore merely compressed or pulled apart. In combination with the maximum pressure gradient according to step c) of the proposed method, there is no change in the profile of the graph. If, however, a changed profile is shown, this can only be attributed to damage to the drive of the high-pressure pump.

Accordingly, with the aid of the proposed method, damage to the drive of the high-pressure pump can be detected, so that a service station can be approached before the vehicle breaks down.

Preferably, in step a) of the proposed method, the pressure (P) in the high-pressure accumulator is measured angle-synchronously, in particular continuously, with the aid of a pressure sensor arranged on the high-pressure accumulator. The measurement is carried out angle-synchronously, that is to say, as a function of the angle of rotation of a crankshaft of the combustion engine.

Further preferably, in step a) of the proposed method, the pressure drop ($\Delta P$) in the high-pressure accumulator is determined with the aid of discrete Fourier transformation (DFT) on a cylinder-specific basis. That is to say, the pressure drop determined in step a) refers to a particular cylinder frequency and is thus due to an injection into that one cylinder.

Furthermore, preferably in step b) of the proposed method, the maximum pressure gradient is determined from the first derivative of the pressure (P) measured in step a). The parameters determined in step a) and step b) can thus be combined.

In order to detect damage to the drive of the high-pressure pump, steps a) to c) are preferably carried out repeatedly. The repeated execution allows the results to be compared over a longer period of time. This is because the increased wear in the contact region between the roller plunger and the cam associated with damage to the drive does not usually occur all at once, but gradually. The observation over a longer period of time allows minor changes to be shown, so that damage to the drive can be detected early.

With the help of the proposed method, a "state of health" statement can in particular be made with regard to the high-pressure pump, which allows damage to be detected early. If damage is detected, a service station can be approached in a timely manner so that a breakdown of the vehicle is prevented. In addition to the pressure measurement in step a) of the proposed method, steps b) and c) are also preferably carried out on board the vehicle, so that a current state of health statement can be made.

Preferably, at least steps b) and c) are carried out with the aid of an electronic control unit. The controller is provided with the measured values that reflect the pressure (P) in the high-pressure accumulator for this purpose. Based on these measured values, the pressure drop (ΔP) and maximum pressure gradient parameters can be determined. The measured values are preferably obtained by the control unit from a pressure sensor arranged on the high-pressure accumulator. With the aid of the control unit, which can in particular be a control unit of the combustion engine, the pressure profile can be continuously monitored. Furthermore, by pairing the pressure drop and maximum pressure gradient parameters derived from the measured values, an analysis can be carried out with respect to the "state of health" of the high-pressure pump.

Upon detection of damage to the drive of the high-pressure pump, a warning signal is preferably output to the driver of the vehicle and/or to an external control station connected to the vehicle via a communication interface. The driver can then approach a service station and have the damage fixed. At the control station, corresponding information from a plurality of vehicles can be collected and evaluated. Furthermore, the availability of a further vehicle can be checked. The warning signal can be an optical and/or acoustic warning signal. The visual warning signal can in particular be displayed via a display in the vehicle and/or in the control station.

Because an electronic control unit is preferably used in the performance of the method, an electronic control unit is also proposed, which is configured so as to carry out steps of a method according to the invention. The electronic control unit can in particular be the control unit of the combustion engine. Because it controls the injections into the cylinders of the combustion engine, it generally already has the measured values required to carry out the method at its disposal. The device-related expense can thus be kept minimal.

Moreover, a computer program having a computer program code is proposed, which carries out steps of a method according to the invention when the computer program is run on a processor. This can in particular be a processor integrated into an electronic control unit.

Furthermore, a machine-readable storage medium having the computer program according to the present invention stored thereon is proposed. For example, the machine-readable storage medium can be an external or internal memory, in particular an internal memory of an electronic control unit.

BRIEF DESCRIPTION OF THE DRAWINGS

The invention will be explained in more detail in the following with reference to the accompanying drawings. The figures show.

DETAILED DESCRIPTION

Figure 1:
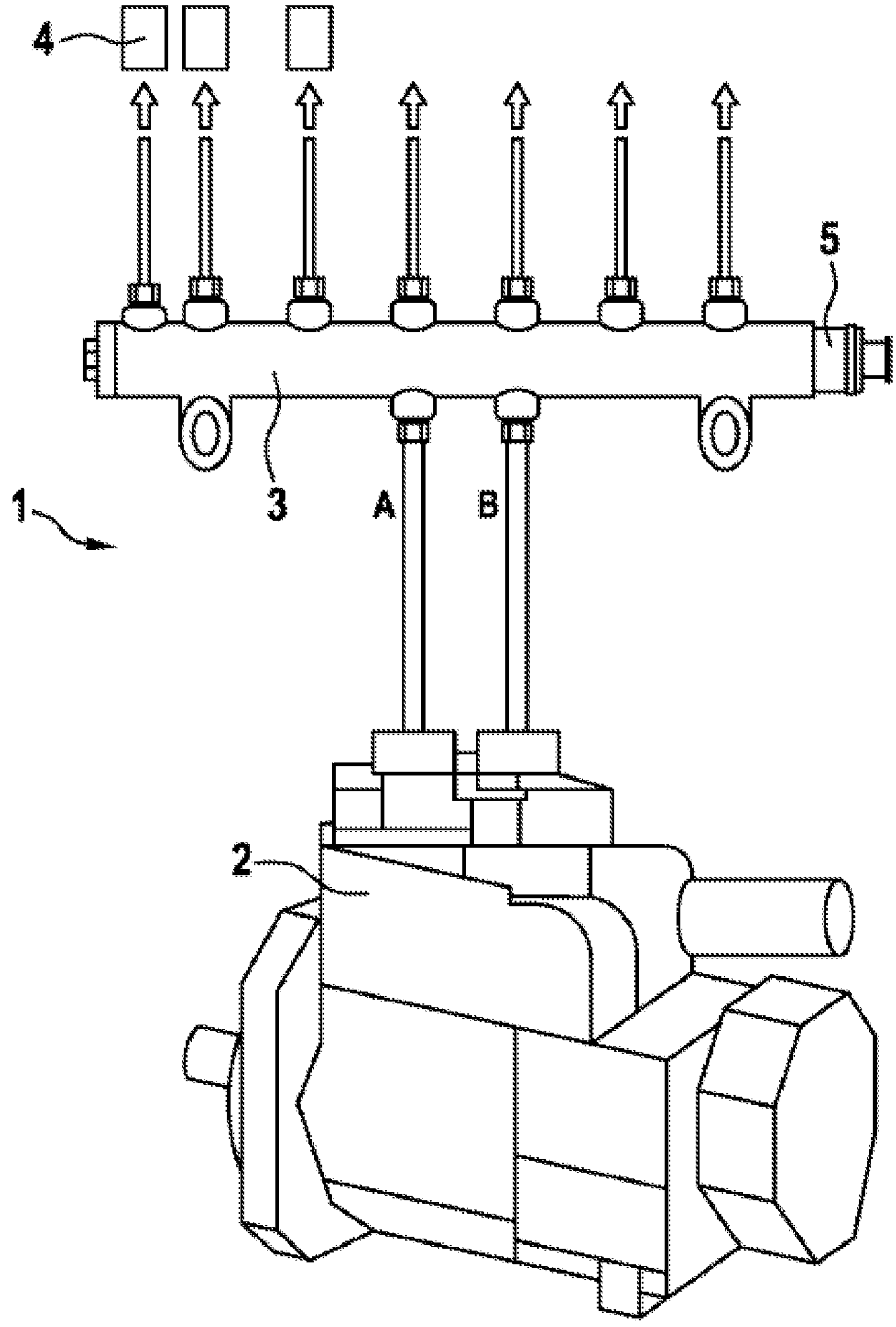
FIG. 1 a schematic view of a fuel injection system having a high-pressure pump having two pump elements, FIG. 2 a) and b) a schematic longitudinal section through a drive of a pump element, a) without damage to the drive, and b) with damage to the drive, FIG. 3 a graph of the pressure profile in the high-pressure accumulator of a fuel injection system during an injection cycle of a high-pressure pump having two pump elements, FIG. 4 a) a diagram for plotting the pressure profile at two different fuel temperatures and b) a graph for plotting the associated pressure gradients, FIG. 5 a diagram for graphing the ratio of pressure drop to maximum pressure gradient on the basis of the values of FIG. 4, FIG. 6 a further diagram for graphing the ratio of pressure drop to maximum pressure gradient on the basis of values measured at a changed fuel temperature, and FIG. 7 a diagram illustrating the ratio of pressure drop to maximum pressure gradient ratio on the basis of values measured in case of damage to the drive.

FIG. 1 shows an exemplary fuel injection system 1 suitable for carrying out a method according to the invention. It comprises a high-pressure pump 2 having two pump elements A and B that are driven by a camshaft (not shown) of the high-pressure pump 2. The pump elements A, B convey fuel at high pressure. The high-pressure fuel is fed to a high-pressure accumulator 3, to which a plurality of injectors 4 are connected for injecting fuel into a cylinder of a combustion engine (not shown). To monitor the pressure in the high-pressure accumulator 3, a pressure sensor 5 is integrated into the high-pressure accumulator 3 at one end.

Figure 2:
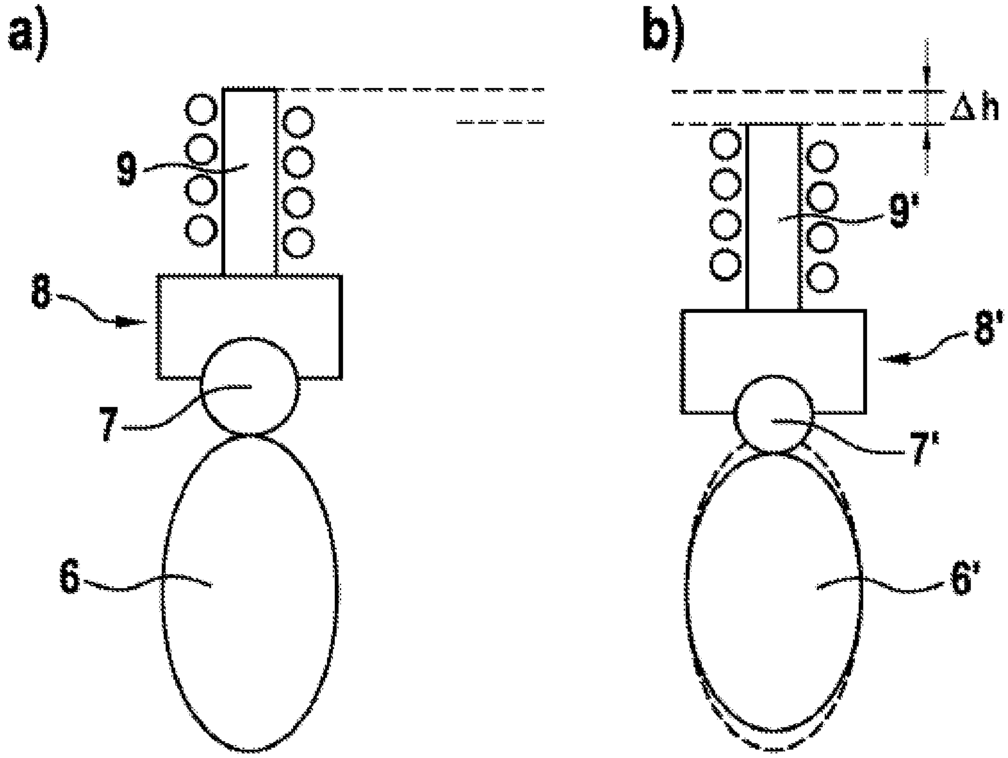

FIGS. 2*a*) and 2*b*) show by way of example a drive for a pump element of a high-pressure pump 2. The drive comprises a camshaft having a cam 6 or 6', on which a liftable pump piston 9 or 9' is supported via a respective roller plunger 8 or 8'. Upon a rotation of the camshaft, a roller 7 or 7' of the roller plunger 8 or 8' runs off circumferentially on the cam 6 or 6', respectively. Depending on the angular position of the cam 6 or 6', the pump piston 9 or 9' moves from a bottom dead center point to a top dead center point or vice versa and carries out a stroke h. In FIG. 2*a*), the cam 6 does not yet have any wear. In FIG. 2*b*), the cam 6' has a clear wear, which can be due for example to the roller 7' not being correctly aligned with respect to the cam 6'. The wear results in the stroke h of the pump piston 9' being smaller by the difference Δh. Accordingly, the conveyance rate of the pump element decreases, so that the pressure build-up required after an injection in the high-pressure accumulator 3 is delayed. The damage to the drive of the high-pressure pump 2 accordingly affects the pressure in the high-pressure accumulator 3.

Figure 3:
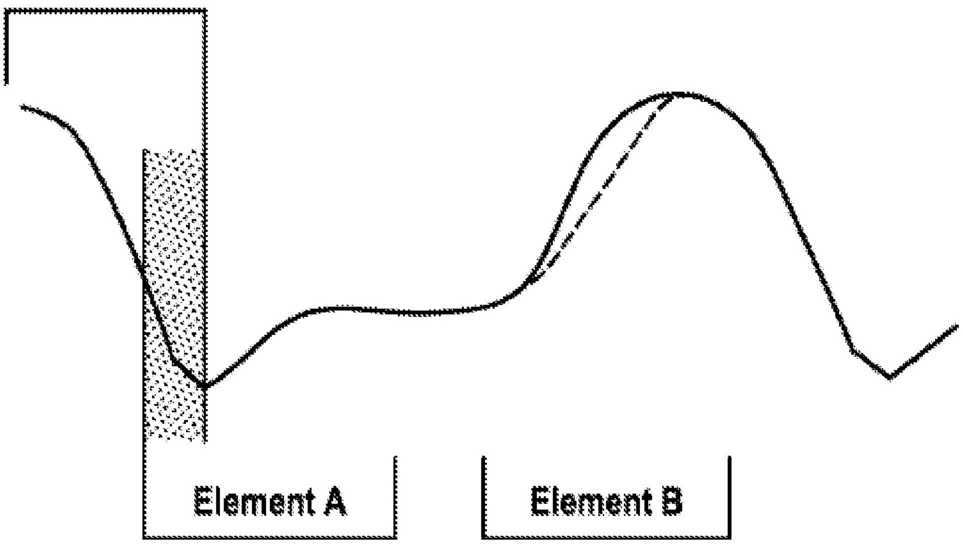

FIG. 3 shows by way of example a pressure profile in a high-pressure accumulator 3 of a fuel injection system 1, which is constructed analogously to that of FIG. 1, during an injection cycle. That is to say, fuel is withdrawn one time from the high-pressure accumulator 3, so that the pressure in the high-pressure accumulator 3 drops. Then, the pressure is rebuilt with the aid of the two pump elements A, B. The pressure build-up by the pump element A is superposed in part by the injection event, so that the pressure build-up with the aid of the second pump element B is more prevalent. If there is any damage to the drive, the profile changes (see dashed line) for the aforementioned reasons. The pressure drop during injection, on the other hand, remains unchanged.

Figure 4:
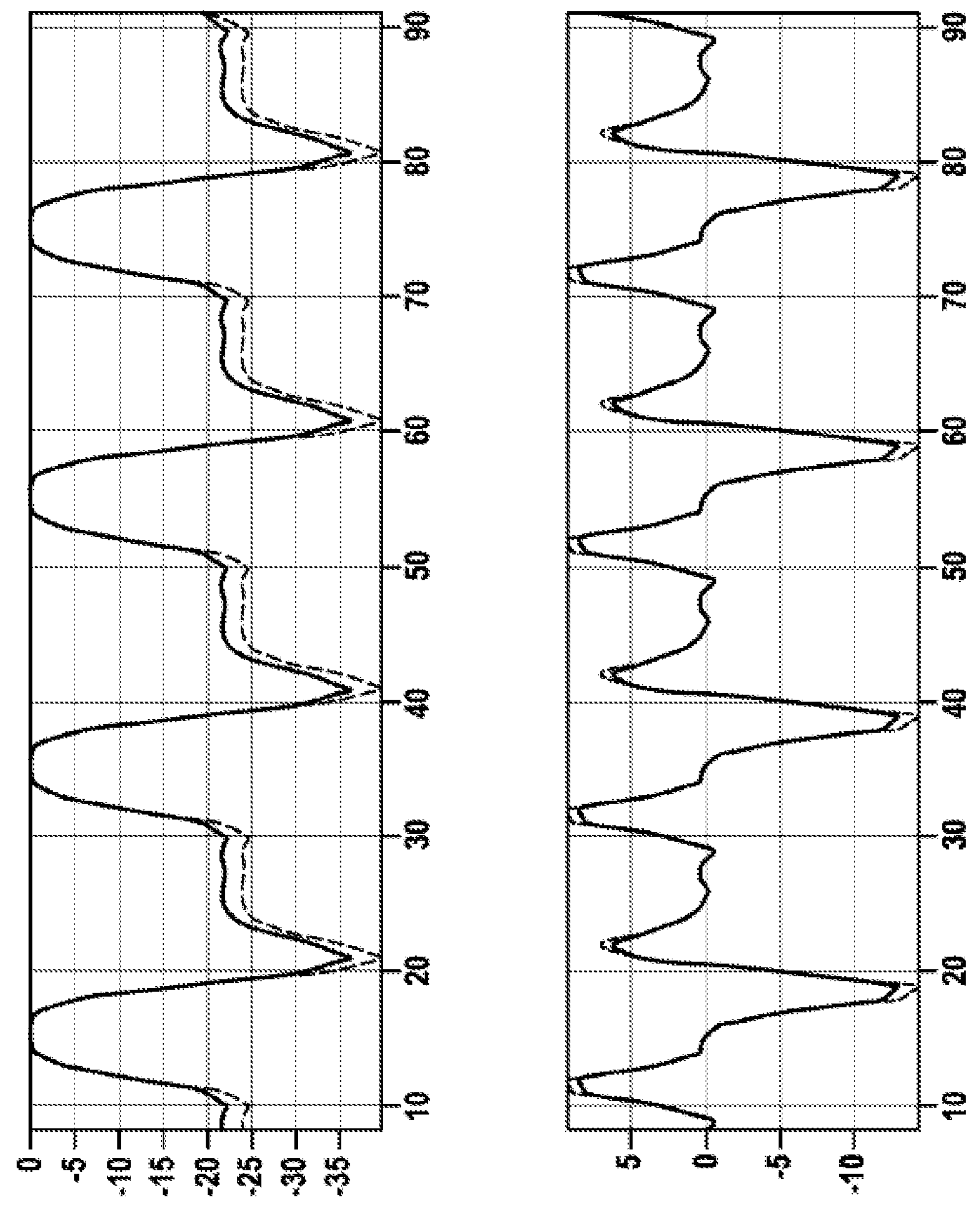

Other factors that can affect the pressure in the high-pressure accumulator 3 are, for example, the fuel quality and fuel temperature, because these factors change the compressibility of the fuel. A change of these factors affects both the pressure drop and the subsequent pressure build-up in the high-pressure accumulator 3. This is illustrated by way of example in FIG. 4*a*), which shows a reference curve as well as a further curve (dashed line) which results in a change of an influencing factor, for example the fuel temperature, by 10%. The bottom part of FIG. 4*b*) shows the first respective derivative for determining the associated pressure gradient.

Figure 5:
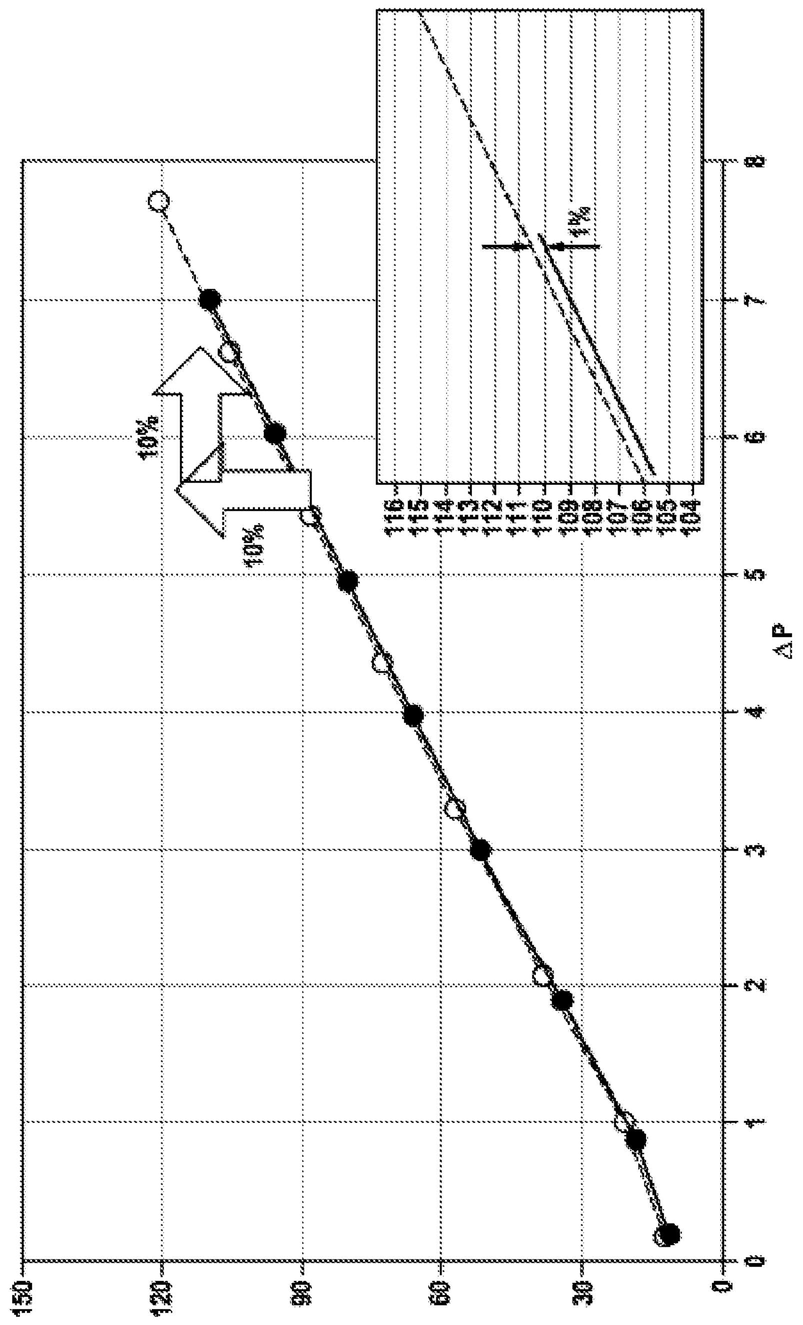

As shown in FIG. 5, if the pressure drop (ΔP) and the maximum pressure gradient are put into proportion, substantially no change in the profile of the graphs can be determined, because the change by 10% affects both the value of the x-axis and the value of the y-axis.

Figure 6:
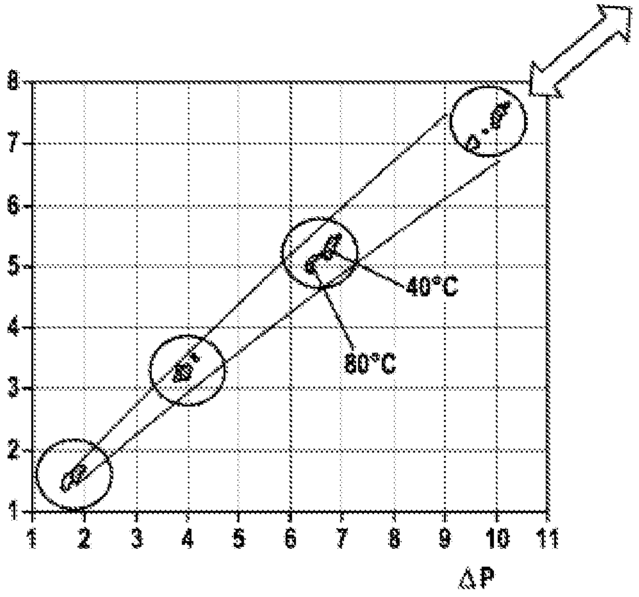

A similar graph showing the ratio of pressure drop to maximum pressure gradient can be seen in FIG. 6. Reference values as well as values with a changed fuel temperature are shown. The graph shows that all values move within a certain tolerance window and thus lie essentially on a line or in a direction (see arrow).

Figure 7:
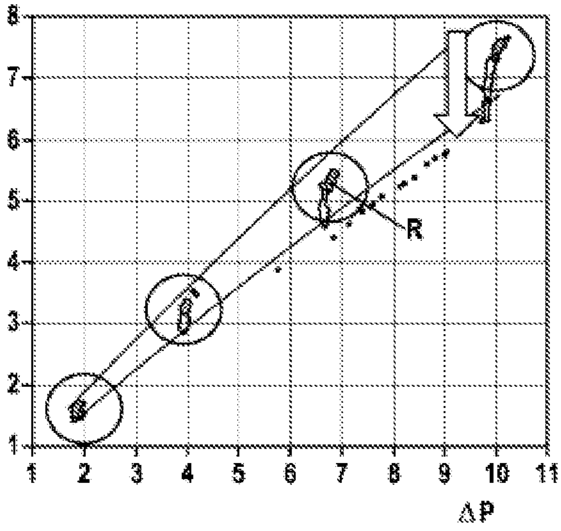

The result is different when the high-pressure pump 3 has damage to the drive. This is shown in FIG. 7 for comparison. This is because, in this case, the values no longer lie on a line, in particular no longer within the tolerance window, but rather move downwards (see arrow) out of the tolerance window. The line thus has a flatter profile, which indicates damage to the drive.

Independently of FIGS. 1 to 7, the method according to the invention is not limited to the application of a high-pressure pump 2 with two pump elements A, B. Furthermore, the method can be carried out in multiple injections. These should preferably closely follow one another.

The invention claimed is:

1. A method for operating a fuel injection system (1) for supplying a combustion engine of a vehicle with fuel, in which method the fuel is conveyed at high pressure with the aid of a high-pressure pump (2), fed to a high-pressure accumulator (3), and injected into a cylinder of the combustion engine with the aid of at least one injector (4) connected to the high-pressure accumulator (3),
wherein, to detect any damage to the drive of the high-pressure pump (2),
- a) the pressure (P) in the high-pressure accumulator (3) is measured and, based on the measured values, a pressure drop (ΔP) in the high-pressure accumulator (3) caused by an injection into a cylinder is determined,
- b) a maximum pressure gradient is determined during a pressure build-up phase following the injection,
- c) the determined pressure drop (ΔP) and the determined maximum pressure gradient are put into proportion, and damage to the drive of the high-pressure pump (2) is detected during an injection cycle when the determined maximum pressure gradient changes and the determined pressure drop (ΔP) remains unchanged.

2. The method according to claim 1,
wherein in step a) the pressure (P) in the high-pressure accumulator (3) is measured angle-synchronously, with the aid of a pressure sensor (5) arranged on the high-pressure accumulator (3).

3. The method according to claim 1,
wherein in step a), the pressure drop (ΔP) in the high-pressure accumulator (3) is determined with the aid of discrete Fourier transformation (DFT) on a cylinder-specific basis.

4. The method according to claim 1,
wherein in step b) the maximum pressure gradient is determined from the first derivative of the pressure (P) measured in step a).

5. The method according to claim 1,
wherein steps a) to c) are carried out repeatedly.

6. The method according to claim 1,
wherein at least steps b) and c) are carried out with the aid of an electronic control unit.

7. The method according to claim 1,
wherein upon detection of damage to the drive of the high-pressure pump (3), a warning signal is output to the driver of the vehicle and/or to an external control station connected to the vehicle via a communication interface.

8. An electronic control device configured to operate a fuel injection system (1) for supplying a combustion engine of a vehicle with fuel, where the fuel is conveyed at high pressure with the aid of a high-pressure pump (2), fed to a high-pressure accumulator (3), and injected into a cylinder of the combustion engine with the aid of at least one injector (4) connected to the high-pressure accumulator (3), by
- measuring the pressure (P) in the high-pressure accumulator (3),
- determining, based on the measured pressure values, a pressure drop (ΔP) in the high-pressure accumulator (3) caused by an injection into a cylinder,
- determining a maximum pressure gradient during a pressure build-up phase following the injection,
- proportioning the determined pressure drop (ΔP) and the determined maximum pressure gradient, and
- damage to a drive of the high-pressure pump (2) is detected during an injection cycle when the determined maximum pressure gradient changes and the determined pressure drop (ΔP) remains unchanged.

9. A non-transitory, computer readable storage medium containing instructions that when executed by a computer cause the computer to operate a fuel injection system (1) for supplying a combustion engine of a vehicle with fuel, in which fuel is conveyed at high pressure with the aid of a high-pressure pump (2), fed to a high-pressure accumulator (3), and injected into a cylinder of the combustion engine with the aid of at least one injector (4) connected to the high-pressure accumulator (3), where, to detect damage to the drive of the high-pressure pump (2),
- a) the pressure (P) in the high-pressure accumulator (3) is measured and, based on the measured values, a pressure drop (ΔP) in the high-pressure accumulator (3) caused by an injection into a cylinder is determined,
- b) a maximum pressure gradient is determined during a pressure build-up phase following the injection,
- c) the determined pressure drop (ΔP) and the determined maximum pressure gradient are put into proportion, and damage to the drive of the high-pressure pump (2) is detected during an injection cycle when the determined maximum pressure gradient changes and the determined pressure drop (ΔP) remains unchanged.

* * * * *